United States Patent [19]

Karner et al.

[11] Patent Number: 5,149,515
[45] Date of Patent: Sep. 22, 1992

[54] PROCESS FOR THE PRODUCTION OR RECOVERY OF ACIDS FROM METALLIFEROUS SOLUTIONS OF SUCH ACIDS

[75] Inventors: Wilhelm Karner, Eichgraben; Dieter Wurmbauer, Österreich; Karl H. Krivanec, Österreich; Juanito Horn, Österreich, all of Austria

[73] Assignee: Maschinenfabrik Andritz Actiengesellschaft, Graz-Andritz, Austria

[21] Appl. No.: 622,352

[22] Filed: Nov. 29, 1990

Related U.S. Application Data

[63] Continuation of Ser. No. 207,206, Jun. 16, 1988, abandoned.

[30] Foreign Application Priority Data

Jun. 16, 1987 [AT] Austria ................. 1534/87

[51] Int. Cl.$^5$ ................. C01B 13/14; C01B 21/40
[52] U.S. Cl. ................. 423/393; 423/483; 423/484; 423/592; 423/DIG. 1
[58] Field of Search ......... 423/483, 484, 393, DIG. 1, 423/592

[56] References Cited

U.S. PATENT DOCUMENTS

| | | | |
|---|---|---|---|
| 1,273,991 | 7/1918 | Bergve | 423/393 |
| 2,155,119 | 4/1939 | Ebner | 423/DIG. 1 |
| 2,771,344 | 11/1956 | Michel et al. | 423/DIG. 1 |
| 3,310,435 | 3/1967 | Robinson et al. | 423/DIG. 1 |
| 3,658,483 | 4/1972 | Lienau et al. | 423/DIG. 1 |
| 3,745,207 | 7/1973 | Hansen | 423/DIG. 1 |
| 3,800,024 | 3/1974 | Forsell et al. | 423/DIG. 1 |
| 3,991,167 | 11/1976 | Depommier et al. | 423/393 |
| 4,083,693 | 4/1978 | Hansen | 423/DIG. 1 |
| 4,325,935 | 4/1982 | Krepler | 423/483 |
| 4,341,747 | 7/1982 | Downey | 423/393 |

FOREIGN PATENT DOCUMENTS

| | | | |
|---|---|---|---|
| 278079 | 9/1964 | Australia | 423/483 |
| 374508 | 6/1979 | Austria . | |
| 2209960 | 9/1973 | Fed. Rep. of Germany | 423/484 |
| 123595 | 9/1979 | Japan | 423/483 |
| 55-38035 | 4/1980 | Japan . | |
| 55-39627 | 9/1980 | Japan . | |
| A-2036573 | 7/1980 | United Kingdom . | |

Primary Examiner—Wayne Langel
Attorney, Agent, or Firm—Fleit, Jacobson, Cohn, Price, Holman & Stern

[57] ABSTRACT

During the pickling, etching, chemical shaping etc. of steels, stainless steels, special alloys and special metals and the dissolution of those metals, metalliferous solutions of the acids employed arise in the course of such processes which must either be disposed of by neutralization or be used for the recovery of the acids and metals by expensive processes. According to the invention the production or recovery of nitric acid or a mixture of nitric acid and hydrofluoric acid takes place by spray-roasting the solutions at temperatures of 200° to 500° in a reactor (1) and subsequent absorptions or condensation of the gases generated in column means (7, 8) at temperatures of 0° to 70° C.

7 Claims, 2 Drawing Sheets

PROCESS FOR THE PRODUCTION OR RECOVERY OF ACIDS FROM METALLIFEROUS SOLUTIONS OF SUCH ACIDS

This application is a continuation of application Ser. No. 07/207,206, filed on Jun. 16, 1988, abandoned.

BACKGROUND AND FIELD OF THE INVENTION

The invention relates to a process for the production or recovery of acids from solutions, in particular solutions of such acids containing metal salts, by spray roasting of the solutions and subsequent absorption and/or condensation of the gases formed thereby, the solids which form thereby being withdrawn.

In particular the invention is directed to a process and an apparatus for the production or recovery of nitric acid or of a mixture of nitric acid and hydrofluoric acid from solutions thereof, in particular from solutions containing cations such as Fe, Cr, Ni, Ci, Zr, Al and others. Such solutions are generated during the surface treatment (pickling, etching, chemical erosive shaping) of steels, stainless steels (chromium and chromium nickel steels) special purpose alloys (e.g. nickel-based alloys) and special surface metals (e.g. titanium, zirconium tantalum) as well as the dissolution of such metals or their compounds in the course of metallurgical processes. Accordingly these solutions contain the ions of the abovementioned metals as well as other alloying elements or contaminants which are contained in smaller amounts. These solutions must be discarded after having attained a certain metal content which—dependent upon the pickled alloy—amounts to 20 to 60 g/l of dissolved metal. Usually such solutions are disposed of by neutralisation. Because of the large amounts of sludge formed thereby as well as the nitrate loads of the effluents this gives rise to an appreciable environmental problem. Moreover, there results for the plant also a major expenditure in respect of the purchase of makeup acid as well as for neutralising chemicals. Accordingly, for several years now, the literature has been describing processes which permit at least a partial recycling of the aforesaid chemicals.

The disadvantage of all those processes is that most of these permit the processing of only one particular waste solution, usually a solution of Fe, Cr and Ni in a mixture of hydrofluoric acid and nitric acid as arises in the treatment of stainless steels. Moreover, in many of those processes the metals contained in the solution are again converted into neutralisation sludge, whereby the dumping problem is not solved.

Generally speaking the aforesaid processes can be subdivided into the following groups.

1. Distillation Processes

In such processes sulphuric acid is added to the spent pickling solution and the volatile acids $HNO_3$ and HF are distilled off. The metal content is converted into a mixture of sulphates which must be processed further. One particular process employs for that purpose a precipitation of the iron in the form of jarosite and the removal of the nickel as the hydroxide. Besides the cumbersome processing methods—several evaporation, crystallisation and filtration stages are required—the chemicals consumption is a further disadvantage. This process cannot be applied to titanium containing solutions, because the titanium sulphates do not crystallise readily.

2. Crystallisation Processes

In this type of process the solution is evaporated down in a special evaporator heated with electric current and then iron fluoride crystals are formed by cooling, the crystals being filtered off. The filtrate constitutes part of the recovered acid, the other part is recovered by thermal decomposition of the fluoride crystals in a rotary kiln in the form of hydrofluoric acid. This process attains a high recovery yield for hydrofluoric and nitric acid, and by roasting off the primarily arising $FeF_3$ crystals, pure hydrofluoric acids can be recovered, not, however, pure nitric acid. Not all cations contained in the solution are precipitated to the same extent by the crystallisation steps, but preferentially iron. Accordingly, a cyclic pickling and regeneration system may give rise to an accumulation of minor elements (Cr, Ni). The process can be applied to certain solutions other than those of Fe/Cr/Ni, e.g. to solutions containing Zr, but not Ti.

3. Extraction Processes

These processes comprise a plurality of process steps, namely iron extraction (with diethyl hexyl phosphate in paraffin), recovery of the extraction agent by the addition of $NH_4HF_2$, crystallisation of $(NH_4)_3FeF_6$, decomposition of the $(NH_4)_3 FeF_6$ at 500° C., calcining of the product at 800 7° C., acid extraction (tributyl phosphate in paraffin)

neutralisation of the residual solution left behind.

Apart from the complicated procedures of this process, it entails a continuous risk of effluent contamination by the extraction agent as well as a fire hazard due to the flammable solvents. The process has been described expressly only for Fe—Cr—Ni solutions. Solutions which contain Ti or other metals cannot be treated in this manner.

4. Ion Exchange Process

In this process the free acids (but not the portion bound to the metal) are sorbed onto an ion exchanger resin and are then recovered by elluting with water. The metals are released in the form of a metal salt solution which must be neutralised. This is therefore not in fact a true regeneration process but merely an upgrading of a partly spent solution. The metal contents which have to be neutralised are present at the same level as in mere neutralisation.

5. Dialysis Processes

These may be operated either as a pure diffusion dialysis or as an electro-dialysis. In the diffusion dialysis there takes place, in analogy to the ion exchange processes, merely a separation of free acids and metal salts, giving rise in principle to the same problem. In the electrodialysis the solution as a whole is first neutralised with caustic potash whereafter the resulting neutral solution of potassium nitrate and potassium fluoride is separated by means of special membranes into acid and caustic potash with the application of electric current. The recovery yields are good. However, the electricity consumption is high and the membranes are very sensitive.

For the complete recovery of hydrochloric acid as is used for the pickling of carbon steel, the spray roasting process has been used for years. In that process the spent pickling solution is sprayed into a reactor where it is contacted with hot gases generated by a burner projecting into the reactor. This results in a complete decomposition of the solution:

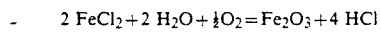
2 FeCl$_2$ + 2 H$_2$O + ½O$_2$ = Fe$_2$O$_3$ + 4 HCl

The metal content of the solution is converted into metal oxide, and the HCl gas which is generated is reabsorbed in water in the form of hydrochloric acid. In order to attain the above described decomposition, temperatures typically in the range of about 500° to 1000° C. must be attained in the reactor. This and similar processes have to date been used only for the recovery of hydrochloric acid. A prejudice existed against the application of this process to the recovery of other acids, e.g. hydrofluoric or nitric acid, because at the aforementioned temperatures a substantial decomposition of the nitric acid into NO was to be expected which cannot be absorbed readily. Moreover, at those temperatures corrosion problems were to be expected.

OBJECTS AND GENERAL DESCRIPTION OF THE INVENTION

It is an object of the invention to provide a process for the production or recovery of nitric acid or a mixture of nitric and hydrofluoric acids from solutions of these acids containing metal salts, whilst overcoming the existing prejudices against the application of the spray roasting process and the absorption of the flue gases for that purpose.

Further or alternative objects will become apparent from what follows.

It has now been found surprisingly that solutions which contain metal ions and nitric acid or a mixture of nitric and hydrofluoric acids, can be decomposed at substantially lower temperatures than those required for the abovementioned solutions containing hydrochloric acid.

The process of the type referred to in the introduction is characterised according to the invention in that for the production or recovering of nitric or hydrofluoric acid or of a mixture of nitric acid and hydrofluoric acid from such solution, in particular from a solution containing cations such as Fe, Cr, Ni, Ti, Zr, Al and others, the solution is atomised at a temperature of 200° to 500° C., preferably 300° to 400° C., and the gases formed thereby are absorbed and/or condensed at a temperature of 0° to 70° C. in an aqueous absorption solution.

A particular embodiment of the invention provides that the absorption as well as the condensation proceeds in two stages, the absorption and condensation taking place in the first stage at a temperature of 20° to 70° C., preferably 50° to 60° C., and the second stage being conducted at a temperature of 0° to 40° C., preferably 20° to 30° C.

The gases generated during spray roasting may advantageously be employed for heating the solution. In contrast to the processes described further above which had been developed for the recovery of hydrofluoric acid and nitric acid, the new process described in what follows permits the treatment of solutions of optional composition, i.e. solutions which contain optional combinations of the cations (Fe, Cr, Ni, Ti, Zr, Al etc.) as well as solutions which contain either hydrofluoric acid alone or nitric acid alone or a combination of these acids.

The metal content of the solutions is recovered in the form of dry metal oxides or metal salts which can be re-used as such or can be processed by further process steps into products (metal powders) of even higher value, or may be dumped without problems.

During the thermal decomposition the following chemical and physical reactions take place in the reactor:

1. H$_2$O(l) = H$_2$O(g); water evaporation
2. HNO$_3$(aq) HNO$_3$(g) ; nitric acid evaporation
3. HF(aq) = HF/g) ; hydrofluoric acid evaporation
4. 2 HNO$_3$(g) = NO$_2$(g) + NO(g) + H$_2$O(g) + O$_2$(g); HNO$_3$-decomposition
4a. 4 HNO$_3$(g) = 3 NO$_2$(g) + NO(g) + 2 H$_2$O(g) + 1.5O$_2$(g); HNO$_3$-decomposition
5. 2 NO$_2$(g) = 2$_2$NO(g) + O$_2$(g); NO$_2$-decomposition
6. MeF$_2$(aq) + H$_2$O(g) = MeO(s) + 2 HF(g); Fluoride decomposition
7. Me(NO$_3$)$_2$ + H$_2$O(g) = MeO(s) + 2 HNO$_3$(g); Nitrate decomposition The reactions 6. and 7. are to be considered a mere example (for a bivalent metal cation). In the case of metals of different valencies or where charged or oxygen complexes arise, these reactions have to be rewritten accordingly.

The metal oxides formed in accordance with 6. and 7. accumulate mostly at the bottom of the reactor from where they are removed continuously with a discharge apparatus. A further part becomes entrained in the flue gas flow and is removed in subsequent dust separators. The flue gas flow is passed to an absorbtion or a condensation plant. In the event that the feed solution contains HF as the only acid component or e.g. a mixture of HF or HCl, the absorption-condensation plant need have but a single column. If the solution contains HNO$_3$ it is necessary to employ at least two columns. The columns are operated with a circulating absorption solution which is cooled to a predetermined temperature in heat exchangers. The concentration of the acid being discharged can be influenced by the selection of the absorption or condensation temperature, as will be explained below.

BRIEF DESCRIPTION OF THE DRAWINGS

The invention is to be described in the following with reference to the drawing. There is shown in FIG. 1 a block diagram of a plant according to the invention for the recovery of acid, FIG. 2, a detail of the block diagram according to FIG. 1, and FIGS. 3 to 5 diagrams for elucidating the invention.

DESCRIPTION OF SPECIFIC EMBODIMENTS

What follows next should be read in the light of the preceding general description of the invention in order to enable persons skilled in the art to practise the invention within the scope of the claims.

Figure 1:
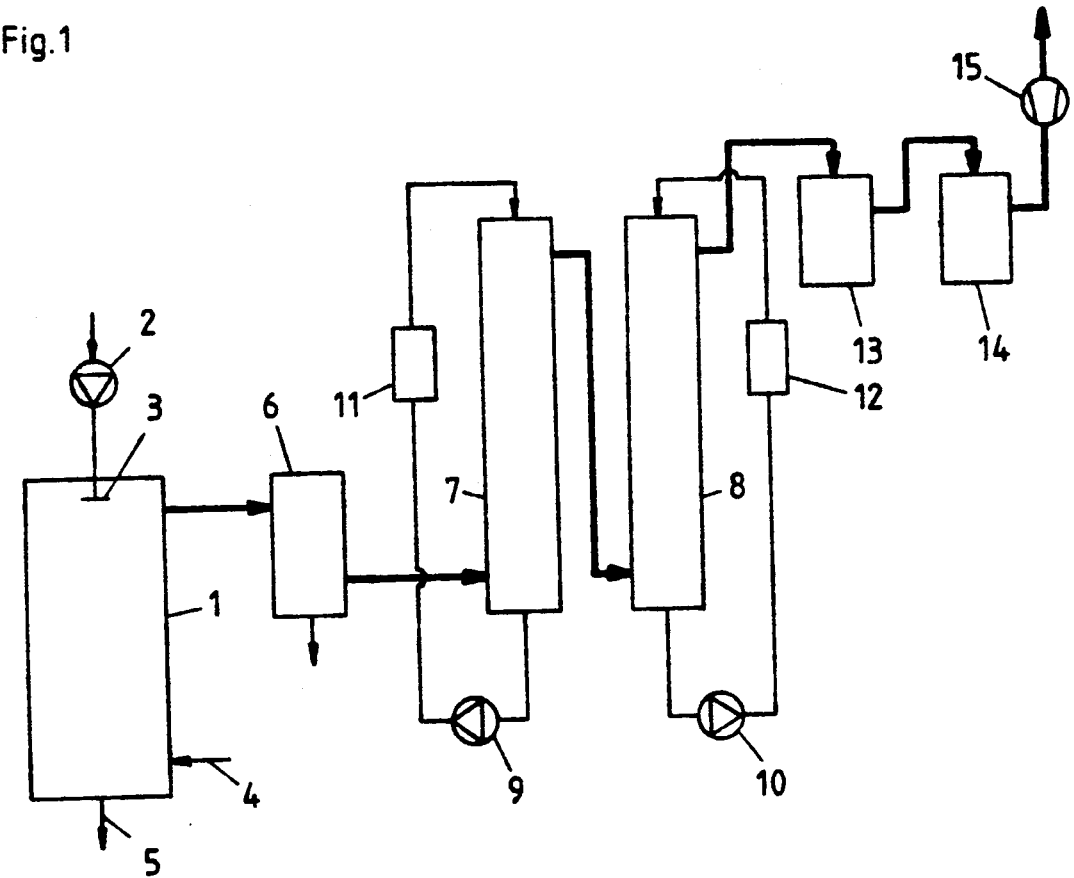

In FIG. 1 a reactor is denoted as 1 which is fed by way of a metering pump 2 with the metalliferous solution to be processed by way of an atomiser nozzle 3. Heating of the reactor proceeds for example with the aid of an acetyleneoxygen burner 4 fitted close to the bottom of the reactor.

Figure 2:
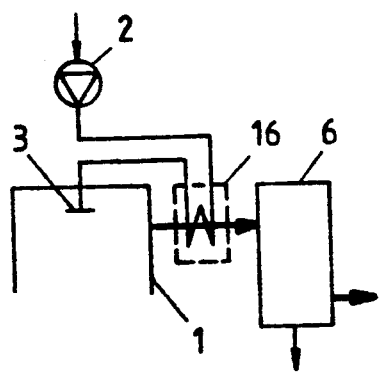

At the bottom of the reactor 1 a discharge apparatus 5 is provided for the continuous discharge of the solids which are formed. The hot flue gases are passed from the top of the reactor 1 to a dust separator 6 in which the remaining solids are separated off. Thereafter the flue gases enter an absorption-condensation plant composed for example of first and second columns 7, 8 connected in series. The absorption liquor (water) is withdrawn by suction from the bottom of each column 7, 8, by way of a pump 9, 10 and is returned, each through a heat exchanger 11, 12 to the head of the respective column 7, 8. The heat exchanger 11, 12 are cooled for example with water. Thereafter the flue gases emitted from the second column 8 are passed through two scrubbers 13, 14 connected in series and are withdrawn suctionally by means of blower 15 from the second scrubber 14. In the modifidation illustrated in FIG. 2, the solution to be processed is preheated in a heat exchanger 16 by the hot flue gases emerging from the reactor 1, resulting in energy savings.

Figure 3:
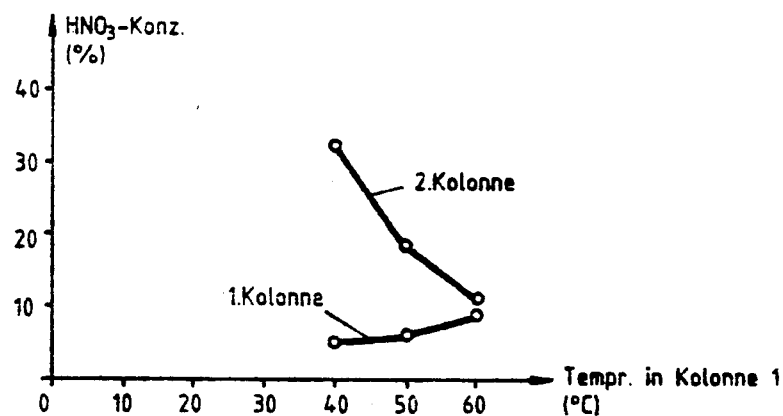
Figure 4:
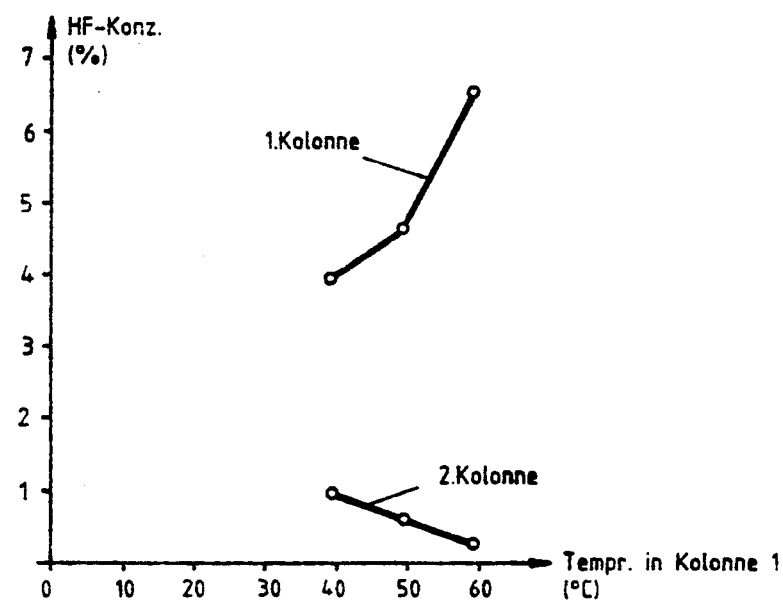
Figure 5:
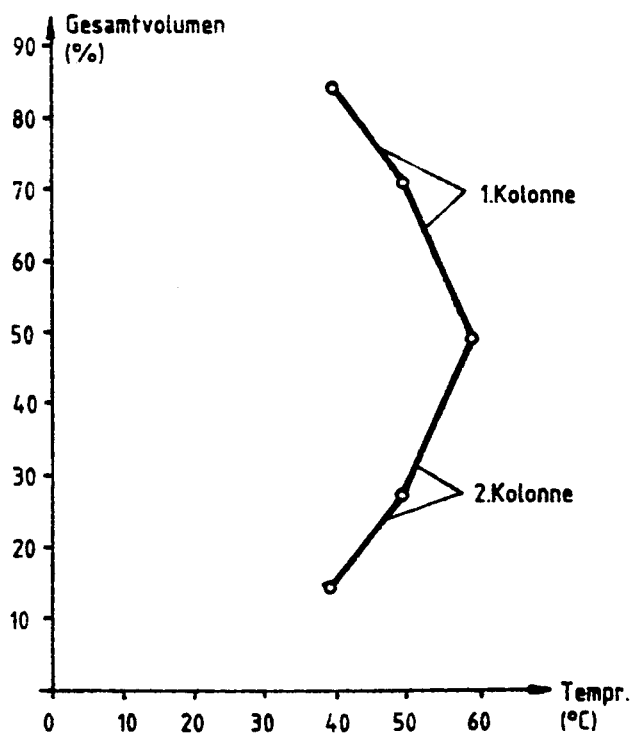

As mentioned previously, the acid concentrations in the first and second columns 7, 8 can be influenced by the selection of the absorption respectively condensation temperatures. The available variation possibilities, e.g. if the second column 8 is kept at a constant 20° C., whilst the temperature in the first column 7 is varied in the range 40° C. to 60° C. is apparent from the diagrams of FIG. 3. It is found that operating conditions can be selected in which in the first column 7 a mixture of hydrofluoric acid and nitric acid is obtained whilst in the second column 8 nitric acid is recovered having but a very low HF content. This is of particular importance in the context of the surface treatment of metals, because certain pickling processes are carried out with a mixture of hydrofluoric acid and nitric acid whilst others are conducted with pure nitric acid. FIG. 3 illustrates the interrelationship between overall volume of the solution throughput and its temperature. It is furthermore found that the hydrofluoric acid regenerated is contained predominantly in the discharge of the first column 7 (95%) and to a substantially lesser part in the discharge of the second column 8 (4%) and to only a very minor part in the oxide (fluoride content of the oxide: 0,2 to 0.2%). The nitric acid must be recovered by adsorption of the nitrous gases. In that procedure initially only that part which is present as $NO_2$ is reconverted into nitric acid according to the following reaction:

8. $3\ NO_2(g) + H_2O(l) = 2\ HNO_3(aq) + NO(g)$; absorption. The NO primarily present in the gas mixture and also the NO content generated by the absorption reaction (8.) must be subjected to oxidation according to the following reaction in order to permit further absorption:

9. $2\ NO(g) + O_2(g)$; oxidation.

The reactions 8. and 9. are widely described in the literature. They form the basis of nitric acid manufacture and are thus state of the art. It is found that the waste gases generated in the reactor by the decomposition of the metal solution have a composition in relation to $NO_2/NO$ ratios permitting a recovery of about 33% of the original nitric acid input in the first column. This corresponds to a degree of oxidation of the flue gasses of 50% according to a decomposition reaction (4.).

By means of an oxidation tower (not illustrated) inserted between the first column 7 and the second column 8, leading to an extension of the residence period, an adequate degree of oxidation is attained for absorbing in the second column 8 of a further 40% of the nitric acid feed.

In addition the nitric acid yields may be increased according to the reaction 10. by the addition of an oxidation agent such as hydrogen peroxide. This may be metered into the system either in the first column 7 or in the second column 8 or alternatively in a separate scrubber. A combination of these modifications is also possible.

This gives rise to the reaction:

10. $NO + H_2O_2 = NO_2 + H_2O$

Finally, the results of practical working examples of the invention will be described.

EXAMPLE 1

The solution which results from the pickling of stainless steel with nitric acid/hydrofluoric acid.

Altogether 16,36 l of a solution having the following composition were sprayed into the reactor over a period of 5,5 hours:
$HNO_3$ 318,0 g/l
HF 35.8 g/l
Fe 36,3 g/l
Cr 19,8 g/l
Ni 25,2 g/l The feeding took place by means of the dosage pump 2 through the atomiser nozzle 3. Heating of the reactor 1 was provided by means of the acetylene oxygen burner 4 fitted close to the bottom of the reactor. This gave rise to a temperature above the burner level of 390° to 470° C. and of 140° to 160° C. in the flue gas.

Suction was applied to the plant as a whole by way of the blower 14, the suctional withdrawal rate amounting to 12,5 m³/h. The flue gases were first passed through the dust separator 5 and then through two column 7 and 8 connected in series and filled with pall rings. The columns 7, 8 were fed with absorption liquor by means of the circulating pumps 9 and 10. In doing so, the temperature of the circulating liquor was kept at a predetermined temperature by means of the heat exchangers 11 and 12. The temperature amounted to 50° C. in the first column 7 and to 22° C. in the second column 8. The absorption solution was water at the beginning of the test whilst the acid content of the solution increased as the test proceeded. Finally the gas was passed through two scrubbers 13 and 14 connected in series.

At the end of the test samples were taken from the columns 7 and 8 and the scrubbers 13, 14 and analysed in respect of $HNO_3$ and HF. Whilst the test proceeded the $NO_x$ and HF content of the flue gas were determined with Draeger tubes. It was possible to establish a mass balance on the basis of the analytical results and the known volumes of the individual items of apparatus. In addition the oxide formed was collected from the reactor 1 and the dust separator 6, was weighed and analysed. At the end of the test the amount of $HNO_3$ introduced was found as follows:
  33,0% in the first column 7, respectively in the overflow of the first column 7.
  43,2% in the second column 8 respectively in the overflow of the second column 8.
  7,2% in the first scrubber 13
  3,0% in the second scrubber 14
  11,5% in the flue gas
  0% in the oxide
  97,9% total At the end of the test the amount of HF introduced was found as follows:
  86,0% in the first column 7, respectively in the overflow of the first column 7
  9,6% in the second column 8 respectively in the overflow of the second column 8
  1,9% in the first scrubber 30

0% in the second scrubber 14
0% in the flue gas
1,3% in the oxide
98,8% total.

The difference between the total and 100% arise from analytic inaccuracies.

EXAMPLE 2

The solution arising from the pickling of stainless steel with nitric acid and ammonium nitrate.

The test was carried out with the same solution as in example 1 except that ammonium nitrate was added to the solution, so as to result in a content of 15 g/l $NH_4NO_3$.

As described in example 1, an overall balance was established for the test as a whole. Thereby it was found that the addition of $NH_4NO_3$ did not result in increased nitrate values of the recovered acid and also that no ammonium could be detected. This gives rise to the conclusion that the ammonium nitrate was converted completely by one of the reactions below.

11a. $NH_4NO_3 = N_2O + 2 H_2O$
11b. $NH_4NO_3 = N_2 + 2 H_2O + \frac{1}{2}O_2$

This fact is of importance because pickling solutions have sometimes added urea $((NH_2)_2CO)$ in order to reduce the undesired formation of nitrous oxide when the metals are dissolved. This gives rise to the partial formation of ammonium nitrate which subsequently by way of the rinsing solution or by virtue of the utilisation of the pickling acid will pass into the effluent, giving rise there to unacceptably high ammonium concentrations. The above described process demonstrates that ammonium nitrate can be removed from the cycle and be destroyed by means of this process.

EXAMPLE 3

The solution which arises from the pickling of pure titanium with nitric acid and hydrofluoric acid.

In analogy to what was described in Example 1, a total amount of 12,29 l of a solution having the following composition was fed in the course of 9 hours:
Ti 32,0 g/l
$HNO_3$ 125,4 g/l
HF 34,8 g/l
$H_2SO_4$ 5,0 g/l The temperature amounted to 390° C. in the burner plane, 45° C. in the first column 7 and 35° C. in the second column 8.

After completing the test, analyses followed as in example 1. Of the total amount of $HNO_3$ introduced there was found:
33,0% in the first column 7, respectively in the overflow of the first column 7
41,4% in the second column 8, respectively in the overflow of the second column 8
7,0% in the first scrubber 13
3,0% in the second scrubber 14
14,5% in the flue gas
0% in the oxide
98,9% overall Of the amount of HF introduced there was found at the end of the test:
98,5% in the first column 7, respectively in the overflow of the first column 7
2,9% in the second column 8, respectively in the overflow of the second column 8
0% in the first scrubber 13
0% in the second scrubber 14
0% in the flue gas
0,1% in the oxide
101,5% overall From the total amount of $H_2SO_4$ there was found at the end of the test:
58,0% in the first column 7, respectively in the overflow of the first column 7
42,0% in the oxide
100,0% overall

EXAMPLE 4

The solution arising from the pickling of pure titanium with nitric acid and hydrofluoric acid plust addition of peroxide.

The experiment was conducted with the same solution as in example 3, however, in the second column 8 a solution of hydrogen peroxide was added. The material balance revealed an increased nitric acid yield in that column had a reduction of the $NO_x$ content in the flue gas:

Of the total amount of $HNO_3$ introduced, there was found:
33.2% in the first column 7, respectively in the overflow of the first column 7
46,5% in the second column 8, respectively in the overflow of the second column 8
8,2% in the first scrubber 13
3,0% in the second scrubber 14
9,5% in the flue gas
0% in the oxide
100,4% overall $H_2O_2$ were added in a stoichiometric ratio to the NO (corresponding to reaction 10), it being assumed that the $NO_x$ present in the flue gas was constituted to 100% by NO.

It is apparent from the above examples that in the metalliferous solution other acids may be contained as well, e.g. sulphuric acid, hydrochloric acid, phosphoric acid as well as other chemical compounds, e.g. ammonium salts or organic substances.

What we claim is:

1. A process for producing an acid selected from the group consisting of nitric acid and a mixture of nitric and hydrofluoric acid from a solution containing anions of the acid by spray roasting of said solution and subsequent condensation and absorption of the gases formed thereby, the solids arising therefrom being withdrawn, comprising the steps of:
   a) spraying into a reactor and atomizing of said solution;
   b) heating the atomized solution of step a) at a temperature range of 300° to 400° C. by contacting the atomized solution with hot gases generated by a burner projecting into the reactor, resulting in a complete decomposition of the solution, thereby converting the metal content thereof into a metal oxide and forming gases and acid in gaseous state; and
   c) condensing and absorbing the gases formed in step b) in an aqueous absorption solution which is cooled to a temperature in the range of 0° to 70° C. in heat exchangers.

2. The process according to claim 1, wherein the condensation and the absorption proceed in two stages, the first stage proceeding at a temperature of 20° to 70° C., and the second stage proceeding at a temperature of 0° to 40° C.

3. The process according to claim 2, wherein the temperature in the first stage is 50° to 60° C.

4. The process according to claim 2, wherein the temperature in the second stage is 20° to 30° C.

5. The process according to claim 1, wherein an oxidising agent is added during the condensation and the absorption.

6. The process according to claim 5, wherein hydrogen peroxide is used as an oxidising agent.

7. The process according to claim 1, wherein the solution containing anions of the acid comprises a waste pickle liquor.

* * * * *